(12) United States Patent
Boyd (10) Patent No.: US 10,830,473 B2
(45) Date of Patent: Nov. 10, 2020

(54) SYSTEMS AND METHODS FOR ZONING SYSTEM SETUP

(71) Applicant: Johnson Controls Technology Company, Auburn Hills, MI (US)

(72) Inventor: Andrew M. Boyd, Wichita, KS (US)

(73) Assignee: Johnson Controls Technology Company, Auburn Hills, MI (US)

( * ) Notice: Subject to any disclaimer, the term of this patent is extended or adjusted under 35 U.S.C. 154(b) by 178 days.

(21) Appl. No.: 15/980,556

(22) Filed: May 15, 2018

(65) Prior Publication Data

US 2019/0346167 A1 Nov. 14, 2019

Related U.S. Application Data

(60) Provisional application No. 62/671,267, filed on May 14, 2018.

(51) Int. Cl.
*F24F 11/46* (2018.01)
*F24F 11/54* (2018.01)
*F24F 11/56* (2018.01)
*G01B 21/00* (2006.01)
*F24F 11/65* (2018.01)
*F24F 11/74* (2018.01)
*G05B 15/02* (2006.01)
*F24F 11/64* (2018.01)
*F24F 140/50* (2018.01)
*F24F 140/40* (2018.01)

(52) U.S. Cl.
CPC .............. *F24F 11/46* (2018.01); *F24F 11/54* (2018.01); *F24F 11/56* (2018.01); *F24F 11/64* (2018.01); *F24F 11/65* (2018.01); *F24F 11/74* (2018.01); *G01B 21/00* (2013.01); *G05B 15/02* (2013.01); *F24F 2140/40* (2018.01); *F24F 2140/50* (2018.01)

(58) Field of Classification Search
CPC .. F24F 11/46; F24F 11/54; F24F 11/56; F24F 11/64; F24F 11/65; F24F 11/74; F24F 2140/40; F24F 2140/50; G01B 11/00; G01B 21/00; G05B 15/02
See application file for complete search history.

(56) References Cited

U.S. PATENT DOCUMENTS

| | | | |
|---|---|---|---|
| 9,747,392 B2 | 8/2017 | Pitzer et al. | |
| 9,753,950 B2 | 9/2017 | Schultz et al. | |
| 9,842,397 B2 | 12/2017 | Wexler | |
| 2016/0282107 A1 | 9/2016 | Roland et al. | |
| 2016/0371855 A1 | 12/2016 | Jovanovic et al. | |

(Continued)

FOREIGN PATENT DOCUMENTS

WO 2016065063 A1 4/2016

*Primary Examiner* — Abdelmoniem I Elamin
(74) *Attorney, Agent, or Firm* — Fletcher Yoder, P.C.

(57) ABSTRACT

The techniques described herein provide systems and methods for guiding a user to accurately measure the volume of each room in a zoned HVAC system using a mobile device. An application on the mobile device guides the user in taking photographs of each room from various positions, various angles, or both. After the mobile device has acquired the photographs, stereophotogrammetry may be used with the acquired photographs to determine the volume of each room. A control system may then calculate an appropriate airflow to be provided to each room based on the volume of each room.

23 Claims, 7 Drawing Sheets

(56) References Cited

U.S. PATENT DOCUMENTS

2019/0155302 A1* 5/2019 Lukierski et al. ...... G06T 17/00
2019/0323823 A1* 10/2019 Atchison .................. F24F 11/52
2019/0378289 A1* 12/2019 Stokking ................. G06T 7/593

* cited by examiner

SYSTEMS AND METHODS FOR ZONING SYSTEM SETUP

CROSS REFERENCE TO RELATED APPLICATION

This application claims priority from and the benefit of U.S. Provisional Application Ser. No. 62/671,267, entitled "SYSTEMS AND METHODS FOR ZONING SYSTEM SETUP," filed May 14, 2018, which is hereby incorporated by reference in its entirety for all purposes.

BACKGROUND

The present disclosure generally relates to heating, ventilation, and air conditioning (HVAC) systems and, more particularly, an application for guiding a user in configuring a zoning system during initial set up.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A heating, ventilation, and/or air conditioning (HVAC) system may be used to control the environmental conditions, such as temperature, within a building or other structure. A zoned HVAC system generally includes dampers in the ductwork of a building to regulate and redirect air to specific areas or zones of the building based on the heat load in that zone. This facilitates the creation of customized temperature zones throughout the building. The zoned HVAC system also includes a control system to control and/or to coordinate operation of devices, such as the dampers. As such, the control system may deliver suitably conditioned air to a zone within the building in order to adequately meet and/or approach a demand for conditioned air.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a climate management system has a control system configured to control climate characteristics in one or more rooms of a building. The control system has a memory device and a processor. The memory device has instructions that, when executed by the processor, cause the processor to provide a zoning layout from the control system to a mobile device. The zoning layout has data associated with the one or more rooms of the building. The memory device also has instructions that, when executed by the processor, cause the processor to receive two or more photographs of a room of the one or more rooms from the mobile device, calculate a first volume of the room by performing stereophotogrammetry with the two or more photographs, and perform climate control in the room based on the calculated volume.

In another embodiment, a zoning configuration system has a mobile device that has image acquisition hardware, a memory device, and a processor. The memory device has instructions that, when executed by the processor, cause the processor to receive a zoning layout from a control system, acquire two or more photographs of a room of the one or more rooms, calculate a volume of the room by performing stereophotogrammetry with the two or more photographs, and transmit the calculated volume of the room to the control system. The control system is configured to determine climate control parameters of the room based on the calculated volume.

In another embodiment, a tangible, non-transitory, machine-readable medium includes instructions that, when executed by one or more processors, cause the one or more processors to receive a zoning layout from a control system configured to control an airflow from a heating, ventilation, and air conditioning (HVAC) system. The zoning layout has data associated with one or more rooms serviced by the HVAC system. The tangible, non-transitory, machine-readable medium also includes instructions that cause the one or more processors to generate a first command to a user of the mobile device to acquire two or more photographs of each room in a first zone, calculate the volume of each room in the first zone by performing stereophotogrammetry with the two or more photographs of each room in the first zone, generate a second command to the user of the mobile device to acquire two or more photographs of each room in a second zone, calculate the volume of each room in the second zone by performing stereophotogrammetry with the two or more photographs of each room in the second zone, and transmit the volume of each room of the first zone and the volume of each room of the second zone to the control system.

BRIEF DESCRIPTION OF THE DRAWINGS

Various aspects of the present disclosure may be better understood upon reading the following detailed description and upon reference to the drawings, in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As will be discussed in further detail below, heating, ventilation, and air conditioning (HVAC) systems often utilize a control system to control the operation of devices or equipment within the HVAC system. A controller, such as a zoning controller, for an HVAC system may be configured to maintain the temperature and/or humidity of each zone in a zoned system at a desired setting. During an installation of a zoned HVAC system, the zoning controller may be programmed by a homeowner or an installer based on the volume of each room in a zone, which is generally calculated or otherwise determined during set up or installation of the zoned HVAC system. The zoning controller then uses the volume measurements of each room to determine an appropriate amount of airflow to be delivered to each zone during operation of the zoned HVAC system. Typically, this involves the homeowner or the installer to manually measure the volume of each room with a measuring tool, such as a range finder. This process can often be cumbersome, time-intensive, and difficult because rooms may not always have a simple cubic shape or have a shape of a rectangular prism. For example, some rooms may have walls offset from one another or are irregularly shaped.

Accordingly, the techniques described herein provide a mobile device application for guiding a user, such as a homeowner or an installer of a zoned HVAC system, to accurately measure the volume of one or more rooms in the zoned HVAC system using the mobile device. For example, the volume measurements may be obtained using the mobile device application without taking any manual measurements using conventional methods. In particular, the mobile device application is configured to guide the user in taking two or more images of a room. For example, the mobile device application may direct the user to take a photograph of the room from one or more positions, from one or more angles, or a combination of both. After the mobile device has acquired the images, the mobile device application may use stereophotogrammetry to determine the volume of the room. The mobile device application directs the user to repeat this process until the volume of every room of every zone has been determined. The mobile device application then communicates the volume measurements of each room to the zoning controller of the HVAC system, which may then calculate an appropriate airflow to be provided to each zone during operation. Thus, by providing a step-by-step guide to a user via a mobile application, the techniques described herein provide a quick and easy tool to determine a volume measurement of each room of a zoning system, and communicate the determined volume measurements to a zoning controller.

Figure 1:
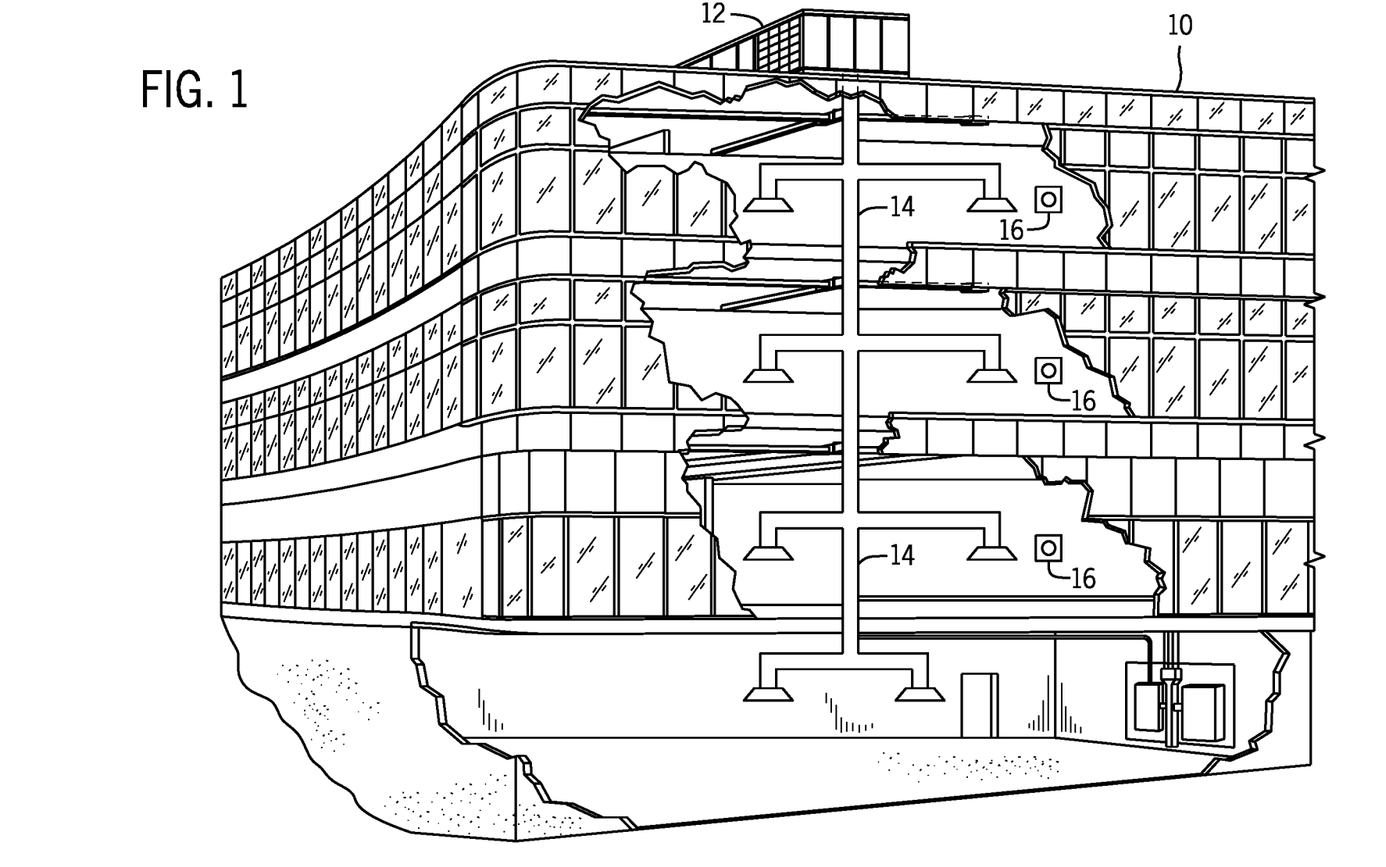
FIG. 1 illustrates a heating, ventilation, and air conditioning (HVAC) system for building environmental management that may employ one or more HVAC units, in accordance with an embodiment of the present disclosure.

Although the details discussed herein are provided with reference to an installation of a new zoned HVAC system, it should be understood that the described embodiments may also be applied to a retrofit zoning installation. Turning now to the drawings, FIG. 1 illustrates a heating, ventilation, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

In any case, the HVAC unit 12 may be air cooled device that implements a refrigeration cycle to provide conditioned air to the building 10. For example, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the air is conditioned, then HVAC unit 12 may supply the conditioned air to the building 10 via ductwork 14 extending throughout the building 10 from the HVAC unit 12. For example, the ductwork 14 may extend to various individual floors or other sections of the building 10. In some embodiments, the HVAC unit 12 may be a heat pump that provides both heating and cooling to the building 10, for example, with one refrigeration circuit implemented to operate in multiple different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and/or the like. Moreover, the control device 16 may include computer systems that are integrated with or separate from other building control or monitoring systems, and even systems that are remote from the building 10.

Figure 2:
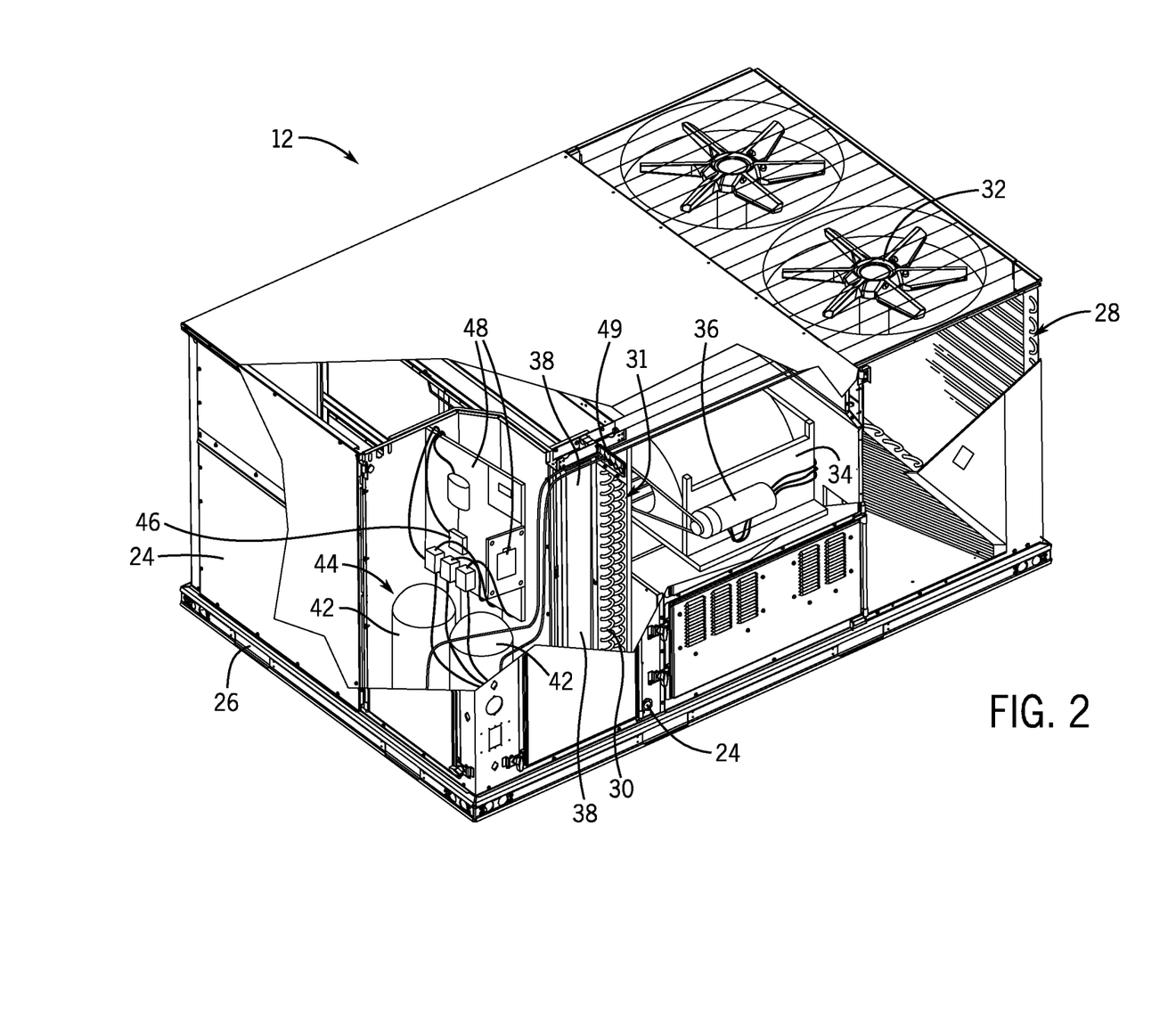
FIG. 2 is a perspective view of a HVAC unit of the HVAC system of FIG. 1, in accordance with an embodiment of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, and/or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and/or the like. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to reduce likelihood of contaminants contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and/or devices may be included in the HVAC unit 12, such as a solid-core filter drier, a drain pan, a disconnect switch, an economizer, pressure switches, phase monitors, and humidity sensors, among other things.

The HVAC unit 12 may receive electrical power via a terminal block 46. For example, a high voltage power source may be connected to the terminal block 46 to power the equipment. The operation of the HVAC unit 12 may be governed or regulated by a control board 48. The control board 48 may include control circuitry connected to a thermostat, a sensor, and/or an alarm. One or more of these components may be referred to herein separately or collectively as the control device 16. The control circuitry may be implemented to control operation of the equipment, provide alarms, and/or monitor safety switches. Wiring 49 may connect the control board 48 and the terminal block 46 to the equipment of the HVAC unit 12.

Figure 3:
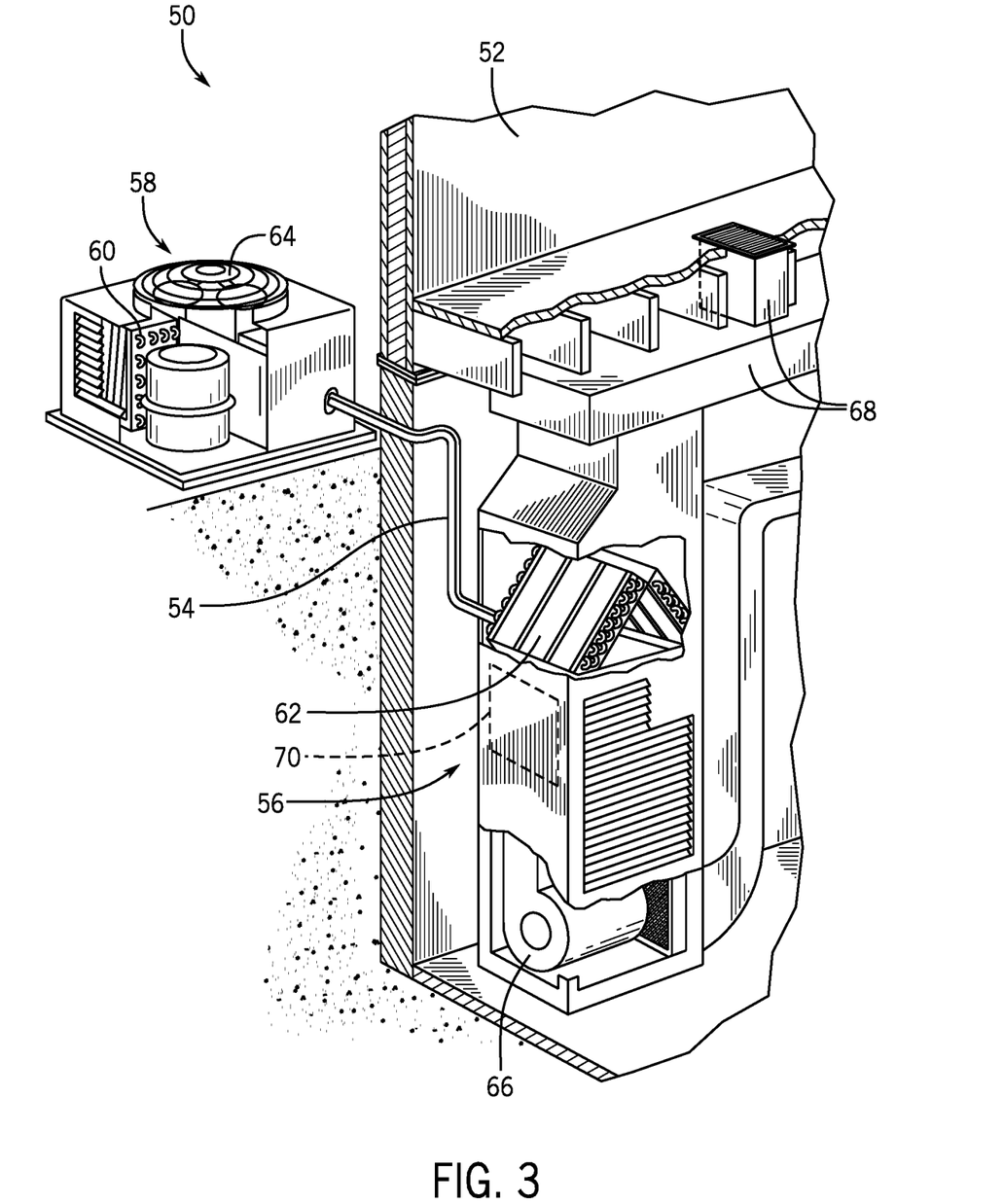
FIG. 3 illustrates a residential heating and cooling system, in accordance with an embodiment of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and/or air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 may transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the setpoint on the thermostat, or the setpoint plus a small amount, the residential heating and cooling system 50 may become operative to refrigerate or cool additional air for circulation through the residence 52. When the temperature reaches the setpoint, or the setpoint minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not implemented to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
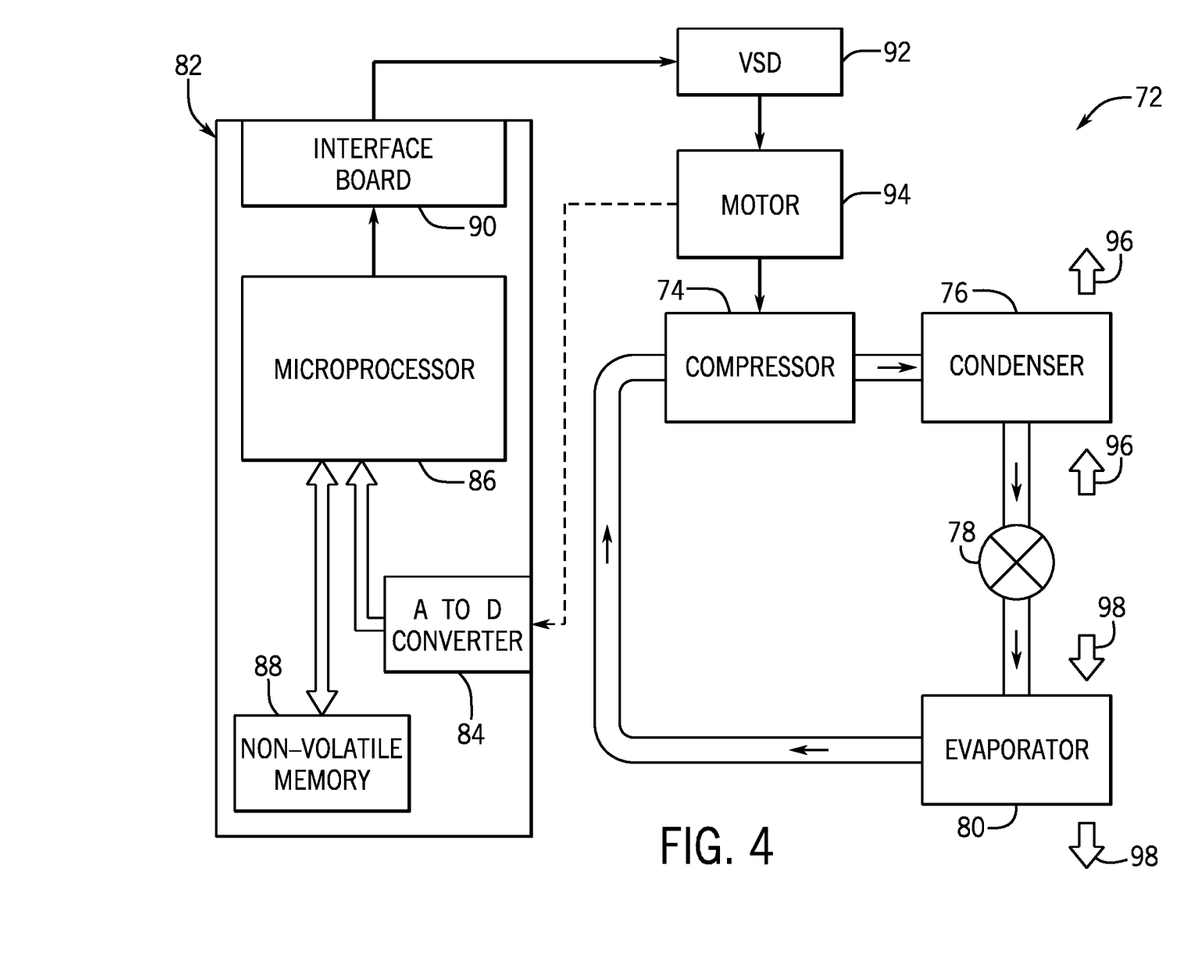
FIG. 4 illustrates a vapor compression system that may be used in the HVAC system of FIG. 1 and in the residential heating and cooling system of FIG. 3, in accordance with an embodiment of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 may receive alternating current (AC) power having a particular fixed line voltage and fixed line frequency from an AC power source, and provide power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator 80 relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC system. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 5:
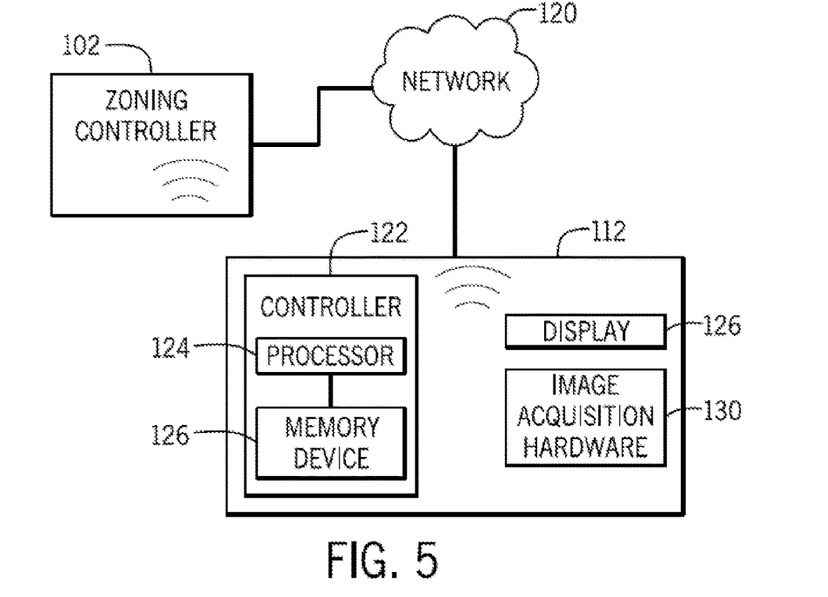
FIG. 5 is a block diagram of a mobile device communicatively coupled to a zoning controller that may be used in the HVAC system of FIGS. 1-4, in accordance with an embodiment of the present disclosure.
Figure 6:
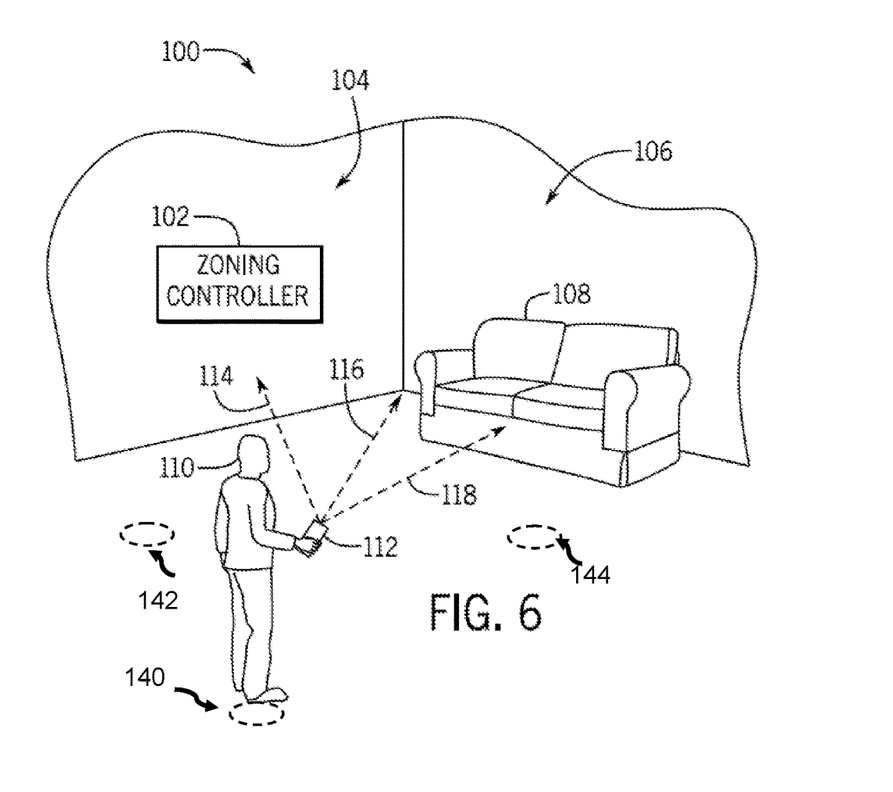
FIG. 6 is a perspective view of a room, illustrating a mobile device guiding a user in measuring the volume of the room, in accordance with an embodiment of the present disclosure.

The description above with reference to FIGS. 1-4 is intended to be illustrative of the context of the present disclosure. The techniques of the present disclosure may include features of the description above. In particular, as will be discussed in more detail below, a mobile device may calculate and/or communicate a calculated volume, such as a measurement in cubic footage, of one or more rooms of a zoned HVAC system wirelessly and/or via a wired connection with a control board 48, such as a control panel 82, during installation or setup of the HVAC system as a zoned system. In some embodiments, the mobile device may communicate the calculated volume measurement to zoning controller 102, as depicted in FIGS. 5 and 6, which may be in wired or wireless communication with control board 48. As described herein, the control board 48 may govern operation of HVAC equipment, such as the HVAC unit 12, one or more dampers, the vapor compression system 72, and/or the like. As such, the control board 48 may control airflow and/or climate conditions during operation of the zoned HVAC system based on the volumetric measurements communicated from the mobile application device to the zoning controller 102.

In certain embodiments, the control board 48, the zoning controller 102, the HVAC unit 12, the dampers, the vapor compression system 72, and/or the like may be referred to herein collectively as a climate management system. As such, the climate management system may control airflow and/or climate conditions during operation of the zoned HVAC system based on the volumetric measurements communicated from the mobile application device to the zoning controller 102.

FIG. 5 is a block diagram of a mobile device 112 communicatively coupled to a zoning controller 102 that may be used in the HVAC system of FIGS. 1-4. Mobile device 112 includes controller 122 which has a processor 124 and a memory device 126. As used herein, the term "mobile device" may refer to a smart device with an integrated camera. For example, the mobile device may include a mobile telephone, a tablet, or other suitable, portable device having a camera. The processor 124 may be used to execute software, such as software for providing commands and/or data to the controller 122, and so forth. Moreover, the processor 124 may include multiple microprocessors, one or more "general-purpose" microprocessors, one or more special-purpose microprocessors, and/or one or more application specific integrated circuits (ASICS), or some combination thereof. For example, the processor 124 may include one or more reduced instruction set (RISC) processors. The memory device 126 may include a volatile memory, such as RAM, and/or a nonvolatile memory, such as ROM. The memory device 126 may store a variety of information and may be used for various purposes. For example, the memory device 126 may store processor-executable instructions for the processor 124 to execute, such as instructions for providing commands and/or data to the controller 122.

Additionally, the processor 124 may generate and display a mobile application, as discussed herein, on display 128. Mobile device 112, including display 128, may possess one or more different interaction points through which the user may interact with the mobile application and mobile device 112. Controller 122 may also receive images captured with image acquisition hardware 130, which may be an internal component of mobile device 112 or be communicatively coupled to mobile device 112 through a wireless or wired connection. In some embodiments, the image acquisition hardware 130 may include a camera for acquiring images of a room. In some embodiments, the image acquisition hardware 130 may acquire video of a room, and the processor 124 may execute suitable software to acquire individual images of the room from the video.

The mobile device 112 and the zoning controller 102 may each include a communication component that enables the mobile device 112 to communicate data between the zoning controller 102 via network 120. The communication component may include a network interface that enables mobile device 112 and the zoning controller 102 to communicate via various protocols such as EtherNet/IP, ControlNet, DeviceNet, or any other communication network protocol. Alternatively, the communication component may enable the mobile device 112 and the zoning controller 102 to communicate via various wired or wireless communication protocols such as Wi-Fi, mobile telecommunications technology, Bluetooth®, near-field communications technology, and the like. As such, the mobile device 112 may wirelessly communicate data, such as a calculated volume measurement of a room, to zoning controller 102.

FIG. 6 is a partial perspective view of a room 100, illustrating a user 110 obtaining volumetric measurements of the room 100 with the mobile device 112, in accordance with embodiments described herein. As illustrated, the user 110 may use a mobile application on mobile device 112 to capture at least two pictures or images, represented by dashed arrows 114, 116, 118, of room 100 to determine a volumetric measurement of room 100 using stereophotogrammetry. Stereophotogrammetry determines three-dimensional coordinates of points of an object based on two or more photographic images of the object. Common points in each image are identified, and a line of sight or a ray is constructed from the location of the camera to each point of the object. The three-dimensional coordinates of the object may then be triangulated from the intersection of the constructed rays.

As described herein, the mobile device 112 may wirelessly communicate with the zoning controller 102. The mobile application on the mobile device 112 may receive a zoning layout from zoning controller 102. As used herein, a "zoning layout" may refer to any suitable representation of the zoned system that associates each room and/or each space in the zoned system with one or more respective zones. For example, the zoning layout may be a graphical representation of a two-zone system with a kitchen, a living room, a first bedroom, and a first hallway associated with a first zone, and a second bedroom, a third bedroom, and second hallway with a second zone. In some embodiments, the zoning layout may have data that defines the dimensions and the geometry of each room and/or each space within the zoned system. Although zoning controller 102 is present in room 100 as illustrated is FIG. 6, it should be understood that a zoning controller may not be present in all rooms in a zone or in a zoning layout. In some embodiments, only one zoning controller 102 is present in a room in the zoning layout. In some embodiments, zoning controller 102 may be located adjacent to a room in the zoning layout but not in any specific room in the zoning layout.

Based on the zoning layout, the mobile application may direct the user 110 to a position 140, 142, 144 in the room 100 to take a picture of the room 100 from a specific angle 114, 116, 118. For example, the mobile application may direct the user to take a picture of the wall 104, the wall 106, or both walls 104, 106. Once the user 110 has taken the picture, the mobile application may direct the user 110 to an additional position 140, 142, 144 in the room 100 to take an additional picture of the room 100 from a specific angle 114, 116, 118. For example, if the mobile application initially directed the user to take a picture of the wall 104 from position 140 and at angle 114, the mobile application may direct the user to take a picture of both walls 104, 106 from position 140 and angle 116. In some embodiments, the mobile application may direct the user to one position, two positions, three positions, four positions, five positions, or any other suitable number of positions to take pictures of the room 100. Additionally, the mobile application may direct the user to take a picture from each position at one angle, two angles, three angles, four angles, five angles, or any other suitable number of angles to take pictures of the room 100. In some embodiments, the angles of subsequent pictures may increment by five degrees, ten degrees, fifteen degrees, twenty degrees, or any other suitable amount, relative to the angle of the preceding picture taken from a particular position.

After the mobile application determines that no additional pictures of the room 100 are desired to determine the volumetric measurement of the room as further described hereinbelow, the mobile application calculates the volumetric measurement of the room 100 using stereophotogrammetry techniques with the acquired photographs of the room 100. The mobile application may identify objects of a substantial size from the acquired photographs that may affect the actual volumetric measurement of the room 100 and subtract a volumetric measurement or estimate of each identified object from the calculated volumetric measurement of the room 100 to obtain an adjusted volumetric measurement of the room 100. For example, the mobile application may identify a couch 108 in the acquired photographs of the room 100 and subtract the volume of the couch 108 from the calculated volumetric measurement of the room 100 as further described hereinbelow. Although only a single couch 108 is illustrated in FIG. 6, it should be understood that a room may contain multiple objects, such as furniture and appliances, which may affect the actual volumetric measurement of the room 100. Thus, the mobile application may subtract the volume of each identified object in the acquired photographs of the room 100 from the calculated volumetric measurement of the room 100 to obtain the adjusted volumetric measurement of the room 100.

Figure 7:
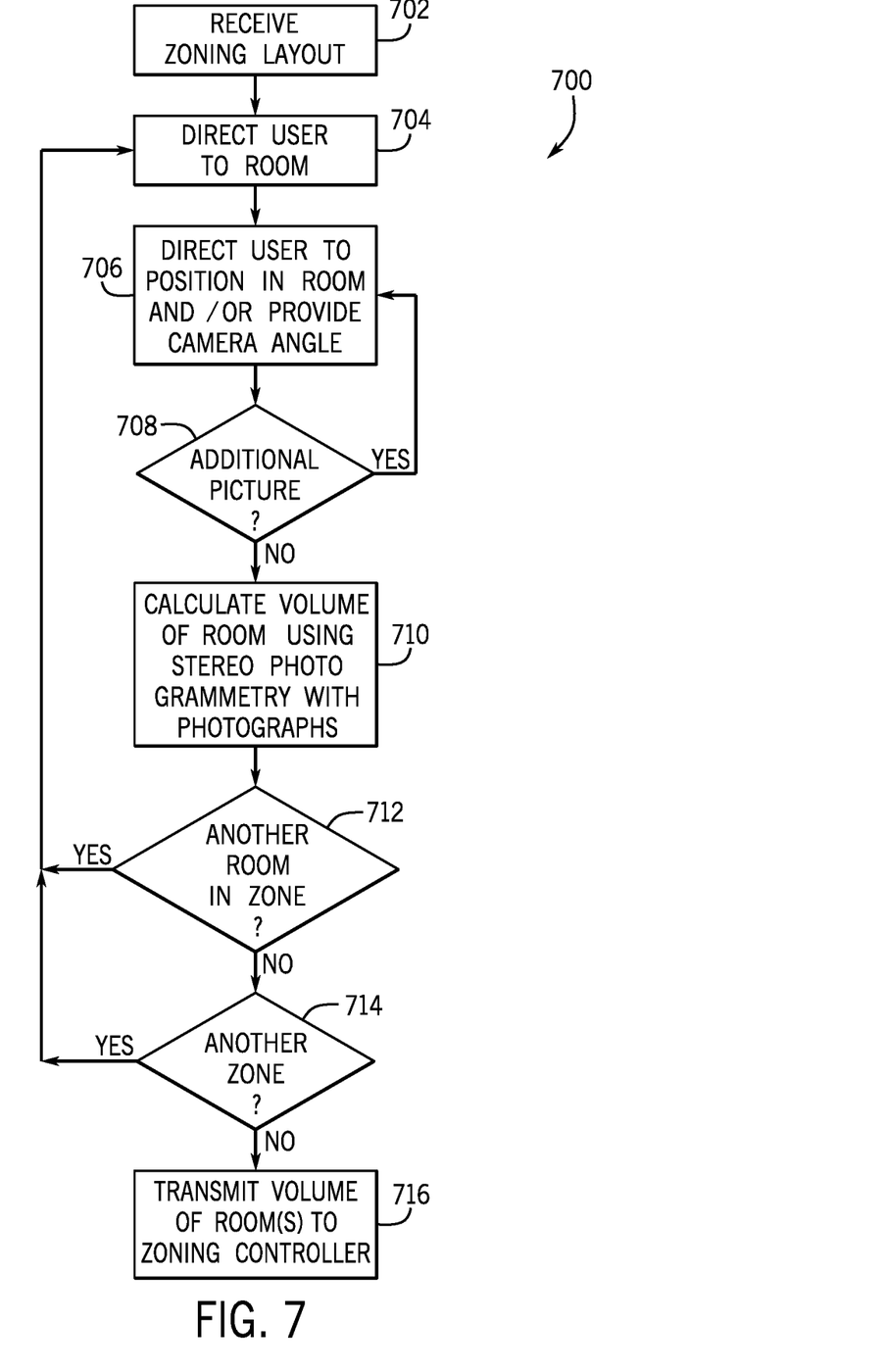
FIG. 7 is a flow diagram of a process for determining the volume of one or more rooms in one or more zones, in accordance with an embodiment of the present disclosure.

FIG. 7 is a flow chart of a process 700 for determining volumetric measurements of zones, each of which may include one or more rooms, using the mobile application. In step 702, the mobile application receives a zoning layout from zoning controller 102. In some embodiments, the mobile application may receive the zoning layout from memory device 126 or from a storage device in communication with the mobile device 112, such as a flash drive. In step 704, after the mobile application receives the zoning layout, the mobile application directs the user 110 to the first room 100 of a first zone of the zoning layout.

In step 706, the mobile application directs the user 110 to a first position 140 in the room to take a first picture of the room 100. The mobile application may also direct the user 110 to take the picture from a specific angle. For example, the mobile application may direct the user 110 to take a picture of wall 104 (depicted as dashed arrow 114), to take a picture of both walls 104, 106 (depicted as dashed arrow 116), and/or to take a picture of wall 106 (depicted as dashed arrow 118). Once the user 110 has taken the first picture, the mobile application may determine whether another picture is desired to determine the volumetric measurement of the room, as indicated in determination step 708. If the mobile application determines that another picture is desired, the mobile application may direct the user to a second position 142 in the room to take a second picture of the room 100. In some embodiments, the second position, and any subsequent positions, may be at the same location within the room 100 as the first position 140 that the mobile application initially directed the user to, but the second picture, and any subsequent pictures, may be taken from a different angle than the first picture of the room 100. For example, the mobile application may direct the user 110 to take a picture of wall 104 for the first picture and direct the user 110 to take a picture of both walls 104, 106 from the same position within the room 100 for the second picture. In some embodiments, the second position 142, and any subsequent positions 144, may be at different locations within the room 100 than the first position 140 that the mobile application initially directed the user to, and the second picture, any subsequent pictures, may either be taken from the same angle and/or different angles than the first picture of the room 100.

Although FIG. 6 depicts three examples of pictures from the same position with different angles, it should be understood that the mobile application may direct the user to take a picture from any position in room 100 or from any angle based on the zoning layout, the dimensions of the room, the geometries of the room, any pictures taken of the room, any objects detected in the room as described below, or any combination thereof. For example, the mobile application may direct the user to stand in a suitable position to take a picture of the ceiling, to take pictures of each wall in a room, to take a picture of each corner where walls intersect in a room, or any other corresponding position and/or angle to obtain a suitable picture for the techniques described herein. Steps 706 and 708 are repeated until the mobile application determines that no additional pictures are desired to determine the volumetric measurement of the room 100. For example, the mobile application may determine that no additional pictures are desired when two pictures of the room 100 have been taken and at least one point is present in both pictures for stereophotogrammetry techniques and analysis to be performed with the acquired pictures. Although the minimum number of pictures desired for the mobile application to use stereophotogrammetry techniques to determine the volumetric measurement of a room is two pictures with at least one common point present in both pictures, it should be understood that the accuracy of the volumetric measurement of the room may increase with the amount of overlapping pictures taken of the room. Thus, the mobile application may determine that no additional pictures are desired after determining that a threshold number of overlapping pictures have been acquired, a threshold number of points in common are present between the overlapping pictures, the acquired pictures correspond to a threshold percentage of the dimensions and/or geometry of the room, or any combination thereof.

In step 710, the mobile application calculates the volumetric measurement of room 100 using stereophotogrammetry techniques with the acquired pictures. For example, the mobile application may calculate the volumetric measurement in cubic feet or cubic meters. In some embodiments, after the mobile application determines the volumetric measurement of room 100, the mobile application may identify certain objects from the pictures of the room 100 that may reduce the actual volumetric measurement of the room 100. For example, the mobile application may identify a couch 108 from pictures of room 100. The mobile application may then adjust the volumetric measurement of the room 100 accordingly. For example, the mobile application may subtract a volumetric measurement of the couch 108 from the calculated volumetric measurement of the room 100 to obtain the actual or adjusted volumetric measurement of the room 100.

Although FIG. 6 depicts only a single piece of furniture in room 100, it should be appreciated that a room may contain multiple objects, such as furniture and appliances, that may affect the actual volumetric measurement of the room 100. Thus, the mobile application may identify objects of a substantial size that may affect the actual volumetric measurement of the room 100 and subtract a volumetric measurement or estimate of each identified object from the calculated volumetric measurement of the room 100 to obtain the adjusted volumetric measurement of the room 100. For example, the mobile application may be configured to subtract volumetric measurements or estimates of objects exceeding a threshold volume. In other words, objects identified in the room 100 that are greater than a threshold volume, such as larger furniture or appliances, may be subtracted from the volumetric measurement of the room 100, while objects identified in the room 100 that are smaller than a threshold volume, such as a lamp or a radio, may not be subtracted from the volumetric measurement of the room 100.

In some embodiments, the mobile application may automatically subtract the volume of each identified object in the pictures of the room 100, such as identified objects greater than a threshold volume, from the calculated volumetric measurement. In some embodiments, the mobile application may prompt the user to confirm whether the volume of each identified object should be subtracted from the calculated volumetric measurement of the room 100. Additionally, the mobile application may determine the volumetric measurement of the identified objects using stereophotogrammetry techniques with the acquired pictures. In some embodiments, the user may confirm the volume of the identified objects before the volume is subtracted from the volumetric measurement of the room 100. The mobile application may also prompt the user to input the volume of any known objects in the room 100. In some embodiments, the mobile application may access a database of default measurements of generic types of objects. For example, the mobile application may determine that couch 108 has a volume of approximately 100 cubic feet from a database that lists a generic or standard couch as having a volume of 100 cubic feet. In some embodiments, the mobile application may access a database of specific measurements of brands and/or models of objects to determine the volume of the identified objects. For example, the mobile application may identify, or the user may provide, a brand and a model of couch 108, and the mobile application may retrieve the volume from a database that lists the volume of specific brands and/or models of couches. As will be appreciated, the techniques described above may be implemented for a variety of objects that may be located within the room 100, such as furniture, appliances, and so forth.

After the volumetric measurement of the room 100 is determined, the mobile application determines if the volumetric measurement of another room in the zone should be determined in step 712. If the volumetric measurement of another room in the zone should be determined, the mobile application may direct the user to a second room of the zone to obtain pictures of the second room in step 704. Thereafter, steps 706 to 712 are repeated for the second room. If the mobile application determines that there is not another room in the zone for which a volumetric measurement is desired, the mobile application may determine whether volumetric measurements of another zone are desired, as indicated at step 714. If volumetric measurements of another zone are desired, the mobile application directs the user to a room in the additional zone. Specifically, the mobile application may repeat steps 704 through 714 for the additional zone. If the mobile application determines that there are no additional zones for which volumetric measurements are desired, the mobile application may transmit the calculated volumetric measurement or the adjusted volumetric measurement for each room in each zone of the zoning layout to zoning controller 102. In some embodiments, the mobile application may transmit the calculated volumetric measurements for each room individually to zoning controller 102 once the mobile application has determined the volumetric measurement for the particular room rather than transmitting all measurements at the same time, such as after all pictures have been taken by the user 110.

Although the preceding description of process 700 provides that the calculation of the volumetric measurements of the room 100 is performed by the mobile application on the mobile device 112, it should be noted that, in certain embodiments, calculation of the volumetric measurements may be performed by the zoning controller 102, the control board 48, or any other suitable device. For example, once the mobile application on the mobile device 112 acquires the photographs for a room, the mobile device 112 may transmit the photographs to the zoning controller 102. The zoning controller 102 may then calculate the volumetric measurement of the room 100 using stereophotogrammetry with the received photographs. In some embodiments, the zoning controller 102 may communicate the photographs received from the mobile device 112 to the control board 48, or the mobile device 112 may communicate the photographs directly to the control board 48. The control board 48 may then calculate the volumetric measurement of the room 100 using stereophotogrammetry with the received photographs.

Figure 8:
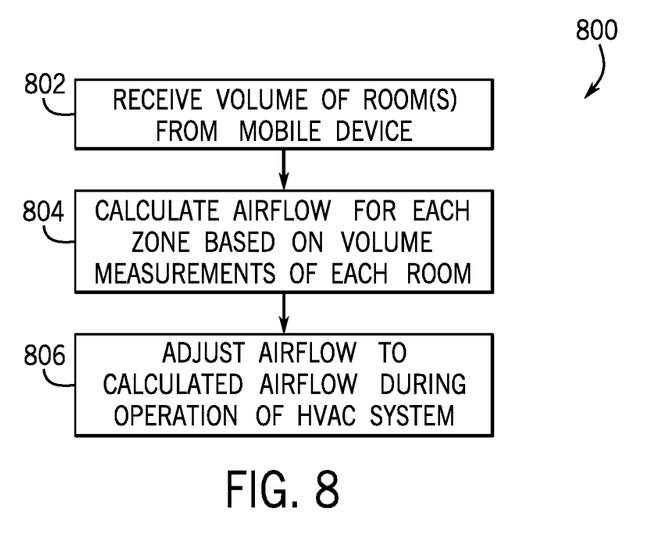
FIG. 8 is a flow diagram of a process for adjusting an airflow to one or more zones during operation of an HVAC system based on the volume calculation or measurement received from a mobile device of the one or more zones.

FIG. 8 is a flow chart of a process 800 in which the zoning controller 102 may determine the appropriate airflow to be delivered by the HVAC system to each zone in a zoning layout. In step 802, the zoning controller 102 receives the volumetric measurements of each room in each zone of the zoning layout from the mobile application on mobile device 112. In step 804, the zoning controller 102 calculates the amount of airflow to be delivered to each zone by the HVAC system based on the received volumetric measurements. In step 806, the zoning controller 102 adjusts the amount of airflow to be delivered to each zone to the calculated amount of airflow in step 804. As such, the HVAC system will deliver the calculated amount of airflow to a zone in response to a demand for conditioned air to the zone.

Although the preceding descriptions of processes 700, 800 are described in a particular order, which represents a particular embodiment, it should be noted that the processes 700, 800 may be performed in any suitable order. Moreover, embodiments of the processes 700, 800 may omit process blocks and/or include suitable additional process blocks. Additionally, while an HVAC system featuring a number of zones is described, in some embodiments, the mobile application may be configured to determine the volumetric measurements of a non-zoned HVAC system. In such embodiments, the mobile application of mobile device 112 may generally follow process 700 for determining the volumetric measurement of the non-zoned HVAC system.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:
1. A climate management system, comprising:
    a control system configured to control climate characteristics in one or more rooms of a building, wherein the control system comprises a memory device and a processor, and wherein the memory device includes instructions that, when executed by the processor, cause the processor to:
    provide a zoning layout from the control system to a mobile device, wherein the zoning layout comprises data associated with the one or more rooms of the building;
    receive two or more photographs of a room of the one or more rooms from the mobile device;
    calculate a volume of the room by performing stereophotogrammetry with the two or more photographs; and perform climate control in the room based on the calculated volume.

2. The climate management system of claim 1, wherein the instructions, when executed by the processor, cause the processor to calculate an airflow rate of conditioned air to be provided to the room based on the calculated volume of the room.

3. The climate management system of claim 2, comprising:
a heating, ventilation, and air conditioning (HVAC) unit configured to provide the conditioned air to ductwork extending throughout the building; and
one or more dampers configured to provide the conditioned air at the calculated airflow rate from the ductwork to the room.

4. The climate management system of claim 1, wherein the room is a first room, and wherein the zoning layout comprises a zone including the first room and a second room of the one or more rooms.

5. The climate management system of claim 4, wherein the calculated volume is a first calculated volume, and wherein the instructions, when executed by the processor, cause the processor to:
receive two or more photographs of the second room;
calculate a second volume of the second room by performing stereophotogrammetry with the two or more photographs of the second room; and
perform climate control in the second room based on the second calculated volume.

6. The climate management system of claim 5, wherein the instructions, when executed by the processor, cause the processor to calculate an airflow rate of conditioned air to be provided to the zone based on the first calculated volume of the first room and the second calculated volume of the second room.

7. The climate management system of claim 1, wherein the instructions, when executed by the processor, cause the processor to:
identify an object in the two or more photographs of the room;
calculate a volume of the object in the two or more photographs of the room;
determine whether the calculated volume of the object is greater than a threshold volume; and
adjust the calculated volume of the room based on the calculated volume of the object.

8. The climate management system of claim 7, wherein the instructions, when executed by the processor, cause the processor to calculate an airflow rate of conditioned air to be provided to the room based on the adjusted calculated volume of the room.

9. A zoning configuration system, comprising:
a mobile device comprising image acquisition hardware, a memory device, and a processor, wherein the memory device includes instructions that, when executed by the processor, cause the processor to:
receive a zoning layout from a control system, wherein the zoning layout comprises data associated with one or more rooms of the building;
acquire two or more photographs of a room of the one or more rooms;
calculate a volume of the room by performing stereophotogrammetry with the two or more photographs; and
transmit the calculated volume of the room to the control system, wherein the control system is configured to determine climate control parameters of the room based on the calculated volume.

10. The zoning configuration system of claim 9, wherein the instructions, when executed by the processor, cause the processor to:
generate a first command to a user of the mobile device to acquire a first photograph of the two or more photographs from a position in the room at a first angle; and
generate a second command to the user of the mobile device to acquire a second photograph of the two or more photographs from the position in the room at a second angle different than the first angle.

11. The zoning configuration system of claim 9, wherein the instructions, when executed by the processor, cause the processor to:
generate a first command to a user of the mobile device to acquire a first photograph of the two or more photographs from a first position in the room; and
generate a second command to the user of the mobile device to acquire a second photograph of the two or more photographs from a second position in the room different than the first position.

12. The zoning configuration system of claim 9, wherein the instructions, when executed by the processor, cause the processor to:
generate a first command to a user of the mobile device to acquire a first photograph of the two or more photographs from a first position in the room at a first angle; and
generate a second command to the user of the mobile device to acquire a second photograph of the two or more photographs from a second position, different than the first position, in the room at a second angle, different than the first angle.

13. The zoning configuration system of claim 9, wherein the instructions, when executed by the processor, cause the processor to:
determine that an additional photograph of the two or more photographs is desired after acquiring each photograph of the two or more photographs based on the zoning layout, dimensions of the room, a geometry of the room, or a combination thereof; and
generate a command to a user of the mobile device to acquire the additional photograph of the room with the mobile device.

14. The zoning configuration system of claim 9, wherein the instructions, when executed by the processor, cause the processor to:
identify an object in the two or more photographs;
calculate a volume of the object in the two or more photographs;
determine whether the calculated volume of the object is greater than a threshold volume; and
adjust the calculated volume of the room based on the calculated volume of the object.

15. The zoning configuration system of claim 14, wherein the control system is configured to regulate operation of a heating, ventilation, and air conditioning (HVAC) system to condition the room based on the determined climate control parameters.

16. The zoning configuration system of claim 9, wherein the determined climate control parameters comprise an airflow rate of conditioned air to be provided to the room.

17. The zoning configuration system of claim 16, comprising:
an HVAC unit configured to provide the conditioned air to ductwork extending throughout the building; and one or more dampers configured to provide the conditioned air at the airflow rate from the ductwork to the room.

18. The zoning configuration system of claim 9, wherein the room is a first room, the calculated volume is a first calculated volume, and wherein the memory device includes instructions that, when executed by the processor, cause the processor to:
- acquire two or more photographs of a second room of the one or more rooms;
- calculate a second volume of the second room by performing stereophotogrammetry with the two or more photographs of the second room; and
- transmit the second volume of the second room to the control system, wherein the control system is configured to determine climate control parameters of the second room based on the second calculated volume.

19. The zoning configuration system of claim 18, wherein the zoning layout comprises a zone including the first room and the second room, and wherein the control system is configured to determine an airflow rate of conditioned air to be provided to the zone based on the first calculated volume and the second calculated volume.

20. A tangible, non-transitory, machine-readable medium, comprising instructions that, when executed by one or more processors, cause the one or more processors to:
- receive a zoning layout from a control system configured to control an airflow from a heating, ventilation, and air conditioning (HVAC) system, wherein the zoning layout comprises data associated with one or more rooms serviced by the HVAC system;
- generate a first command to a user of the mobile device to acquire two or more photographs of each room in a first zone;
- calculate the volume of each room in the first zone by performing stereophotogrammetry with the two or more photographs of each room in the first zone;
- generate a second command to the user of the mobile device to acquire two or more photographs of each room in a second zone;
- calculate the volume of each room in the second zone by performing stereophotogrammetry with the two or more photographs of each room in the second zone; and
- transmit the volume of each room of the first zone and the volume of each room of the second zone to the control system.

21. The tangible, non-transitory, machine-readable medium of claim 20, wherein the instructions, when executed by one or more processors, cause the one or more processors to:
- identify an object in the two or more photographs of a room in the first zone;
- calculate a volume of the object in the two or more photographs;
- determine whether the volume of the object is greater than a threshold volume; and
- adjust the volume of the room based on the volume of the object.

22. The tangible, non-transitory, machine-readable medium of claim 20, wherein the instructions, when executed by one or more processors, cause the one or more processors to generate commands to the user to acquire each photograph of the two or more photographs from different positions or different angles within each respective room.

23. The tangible, non-transitory, machine-readable medium of claim 22, wherein the different positions or different angles are determined based on the zoning layout.

* * * * *